April 26, 1932. T. B. MOREHOUSE 1,855,584
RECORDING AND REPRODUCTION OF SOUND
Filed Dec. 6, 1928

INVENTOR
TERRY B. MOREHOUSE
BY
ATTORNEY

Patented Apr. 26, 1932

1,855,584

UNITED STATES PATENT OFFICE

TERRY BRYAN MOREHOUSE, OF BROOKLYN, NEW YORK, ASSIGNOR TO RADIO CORPORATION OF AMERICA, A CORPORATION OF DELAWARE

RECORDING AND REPRODUCTION OF SOUND

Application filed December 6, 1928. Serial No. 324,101.

In the usual process of the recording and reproduction of sound, in talking moving-pictures, the film has a sound record running along one edge between the edge of the picture portion and the sprocket holes.

The sound record is usually photographically recorded either as varying density light striturations or the varying area light and dark portions. Thus the sound record appears on the film as a strip having a varying density or having variable area of light and dark portions so that a light beam passing through the sound portion of the film, and focused upon a photo-electric cell causes a fluctuating current to be produced which current is utilized to operate convenient sound apparatus. In the recording of the sound, either the light from a light source varied in intensity in accordance with the sound to be recorded, or the light from a constant light source shuttered by a shutter operating in accordance with varying sound waves, is focused upon a moving film and serves to produce a variable density record or a variable area record respectively.

Considerable difficulty is experienced in both the recording and the reproduction of sound by the above methods, due to the fact that in order to accurately reproduce the sound, it is necessary that the total light illuminating the film or emanating therefrom at any given instant correspond exactly to the instantaneous electrical current desired. In other words, the sound record on the film should, at every given instant, directly represent the actual acoustic displacement of the diaphragm of the microphone used in the recording process, similarly in the reproduction the reproducing apparatus must be capable of integrating the sound curve so that the current in the photo-electric cell will correspond as exactly as possible to the instantaneous value of the sound recorded, and therefore as nearly as possible to the current in the microphone circuit allowing, of course, for the amplification characteristics required. This is all in accordance with the requirement of acoustics, that for an accurate reproduction of sound it is necessary that the reproducing apparatus vibrate not only at the frequency of the note being recorded, but that the slope of the reproducer curve should be the same at all times as the slope of the original acoustic vibration. This is required in order to give the proper timbre, resonance, etc., to the reproduced tone and to produce faithfully the various overtones and harmonics existing in the original sound.

It is apparent that with the present methods of sound reproduction and recording, if an appreciable area or linear length of the film is exposed to the light at a given instant, a very sharp or sudden surge of the acoustic displacement will fail to act upon the light sensitive cell and produce a current of the proper proportion. This is because the finite length of the sound strip under inspection at a given instant is comparatively greater than the extent of the sudden pulse, the effect of which is therefore rounded off or summated in reproduction and the tone values are consequently modified and, at high frequencies, even lost altogether.

Further, it is evident that the resistance of a light sensitive cell has some inertia under the rapid changes of intensity of the light falling upon it and that this inertia will vary throughout the range of light intensities. It is, therefore, desirable to have as much light striking the cell at all times as is possible. This has been done by means of a biasing light, the light coming through the film acting merely as an increment to the biasing light.

Because of these necessary limitations in the present methods in reproduction of sound from the photographic sound record the total change of resistance of a cell under the effect of light from the record is necessarily small and it is therefore difficult to reproduce from a single record a sound varying greatly in volume or sound intensity.

In the present methods, therefore, it is either necessary to control the volume of the sound reproduced manually in the reproduction or to provide an additional or volume control record on the same or a simultaneously run film.

In designing photo-electric reproducing apparatus for talking movies, a compromise must be made between the amount of variation of light acting upon the cell to effect resistance changes in the cell, and the loss of faithfulness in reproduction caused by illuminating too great a portion of the film. Considerable work has been done toward limiting the amount of light falling upon the film or upon a photo-electric cell to a very small linear amount. This has been done by the use of a narrow slit adapted to pass light only to a small area of the film. It has also been done by the use of a linear filament of tenuous formation and perhaps under tension, the image of which is focused upon the film. The light passing therethrough is caused to fall upon a photo-electric cell and the resultant fluctuations serve to control the current in the reproducing apparatus. All of these methods of reducing the linear extent of illumination are subject to considerable difficulty and many disadvantages. Among these disadvantages are the possibility of the very narrow slit clogging and thus rendering it useless for either recording or reproduction, the difficulty in producing the proper amount of light from a very thin filament or from a very thin slit in order to overcome the inertia effects of the photo-electric cell and give a sufficient resistance change under light fluctuations and limited volume range obtainable.

It is the main object of this invention to provide an improved means of sound recording and reproduction.

It is another object of this invention to obviate each of the above noted difficulties as will be hereinafter clearly set forth.

It is a further object of this invention to produce a light sensitive cell which will reproduce recorded sound impulses from a film with great faithfulness and without undue distortion.

It is still a further object of this invention to overcome the effects of the varying film density due to developing the film and permit sound to be reproduced from differently developed films with identical results.

It is also an object of this invention to produce a method and light sensitive cell for the reproduction of photographic sound records which will give full range of sound or volume intensity to fulfill any of the requirements of reproduction.

It is another object of this invention to provide full automatic flexibility of volume control in reproduction without the necessity of an additional or supplementary volume control record.

It is another object of this invention to produce a method of sound reproduction wherein change in the flow of current in the reproducing system shall be directly proportional to the changes in the controlling intensity in recording.

It is a final object of this invention to simplify the equipment necessary for the proper recording and reproduction of sound upon moving films.

In carrying out this invention, the moving light sensitive film may be exposed to a pencil of light, the lateral displacement of which is in direct proportion to the acoustic displacement of the sound being recorded. On the positive print, the sound record would then appear as a white line, the lateral displacement of which is continuously varied. It is to be understood, of course, that the pencil of light would have a very small longitudinal extent and might be in an elongated diamond shape, the length of which would be across the film. On the other hand, the sound record may be made in the usual manner, producing what is known as a "sawtooth" record, the use of which will be explained hereinafter.

Having briefly described my invention, reference should now be made to the accompanying drawings which:

In Fig. 1 shows a section of a talking movie film.

Figure 1:
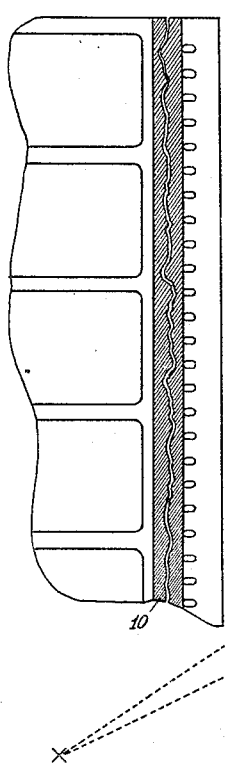

Referring now more particularly to the accompanying drawings Fig. 1 shows the sound record 10, disposed at the side of the ordinary moving picture film and consisting on the positive of said film of an opaque sound strip 10 having a sinuous line representing the sound fluctuations traversing the length of it.

Figure 2:
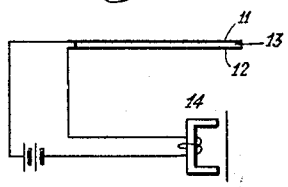
Fig. 2 shows a schematic arrangement for a light sensitive cell constructed in accordance with my invention.

The light sensitive cell shown in Fig. 2 is composed of two thin metallic plates 11 and 12, of high resistance material, separated a small amount, by a light sensitive substance 13. The plates 11 and 12 have a very high resistance in comparison with the resistance between them across the photo-electric substance when the latter is under the influence of light. The separation of the plates is very slight. The two plates 11 and 12, are connected in series with a source of potential and the reproducing or sound device diagrammatically represented at 14. A light passing through the film is so focused that its enlarged image will fall across the light sensitive cell and the influence of light on the photo-electric material will form a conducting path between the resistance plates 11 and 12 and the resistance of the cell will be varied by the location of the light falling on the cell relative to the ends of the resistance plates. It is to be understood that the slight distance separating the two plates will represent a very slight linear length of the original film, because of the enlargement of the image thereof which is cast upon the cell by any suitable focusing means.

Figure 3:
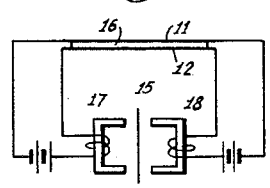
Fig. 3 is a schematic diagram showing the modification of the connections for reproducing sound in accordance with my invention.

Fig. 3 shows a similar arrangement wherein the speaker element is of a differential type and is adapted to be driven by circuits from either end of the light sensitive cell 16. The differentially actuating magnets 17 and 18 are connected to the opposite ends of the resistance plates 11 and 12 and the resistance in circuit with each of said actuating devices is adapted to be differentially varied by varying the location of the short circuiting path between the plates 11 and 12 due to the variation of the location of the image of light passing through the film of Fig. 1.

Figure 4:
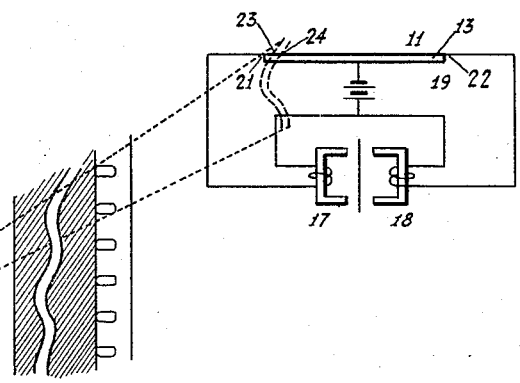
Fig. 4 is a schematic diagram showing a still further arrangement of my light sensitive cell illustrating the action in reproducing the record on the talking movie film.

Fig. 4 shows another arrangement wherein the plate 11 is similar to that of Figs. 1 and 2 and is composed of the high resistance material the resistance of which is considerable with respect to the resistance of the light sensitive substance placed between the plates when the latter is under the influence of light. The opposite or base plate 19 is of any low resistance material so that the resistance in the circuits of each of the speaker units 17 and 18 is adapted to be inversely varied in accordance with the location of the beam of light thrown upon the cell through the film of Fig. 1 with respect to the points 21 and 22. The device 17 has in its circuit, the high resistance between the points 21 and 23 and the device 18 has in its circuit the high resistance between the points 22 and 24. In this latter arrangement, the separation of the plates 11 and 19 by the light sensitive substance is unimportant.

It can be readily seen from this that the tone being produced is dependent merely upon the location of the single points 23 and 24 and in passing over a peak in the record these points will be successively moved to each and every point of the peak and the reproduction will consequently be considerably more faithful than it would be if a considerable portion of the linear length of the sound record had to be considered, as in each of the present processes.

Figure 5:
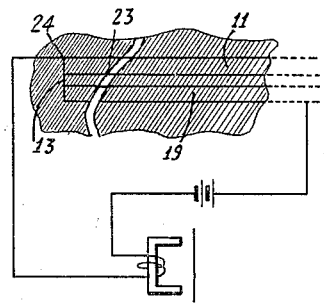
Fig. 5 is an enlarged view of a section of my light sensitive cell.

Fig. 5 shows this principle more in detail as applied to the single drive, the thickness of the plate 11 in this case being considerably exaggerated. However, it is to be understood that the resistance of the light sensitive material is comparatively small when under the influence of light of the desired intensity so that the resistance of the path between the two plates 11 and 19 is comparatively small in comparison to the resistance between the points 21 and 23, which latter constitutes the determining factor in the reproduction.

The light sensitive cell may be constructed in any desired manner and any suitable light sensitive material may be employed. For instance, a layer of selenium may be placed upon a low resistance strip such as copper and the opposite side of the selenium may be coated with some high resistance material such as lamp black or india ink and the sandwich thus composed carefully cut off to present its cross section to the influence of light. Suitable connections are then made and the cell is ready for operation.

The cell may be constructed by placing a platinum or tungsten or other high resistance wire a short distance from another wire either of high or low resistance and filling the space between the two with any desired light sensitive substance. The wire may be supported in any desired manner, as from an insulating frame work or by securing to an insulating member.

A layer of light sensitive substance may be coated upon a piece of the plate and a line of some high resistance conducting ink may be painted or otherwise coated upon the surface of the photo-electric substance and suitable connections may be made thereto. In this case with the light falling upon the cell, it can be seen that the portion of the resistance line on one side of the point where the shadow of the sound track cuts it, would determine the resistance of the cell.

A liquid reproducing cell may be used in which case some light sensitive fluid such as the potassium hydride is enclosed in the container and the plates 11 and 12 are composed of very fine platinum or other high resistance wires separated by a small amount and suspended within said fluid. A single high resistance wire may be used instead of two and the connection made through a copper or other low resistance wire.

Many other equally obvious means may be employed, the only requirement of this invention being that the resistance of the total cell is adapted to be varied not by a change of light intensity or amount of light in any sense but by the location of the beam of light impinging upon the cell.

Figure 6:
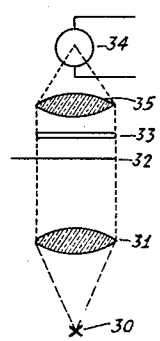
Fig. 6 is an alternative method of reproducing from the film of my invention.

Referring now more particularly to Fig. 6 there is shown an alternative method for reproducing sound from my type of photo sound record. The film 32 is interposed between the light source 30 and the condenser lens 31 and the lens 35. Between the film 32 and the cell 34, the latter of which may be of any desired construction, is interposed a graduated light filter or color screen 33. The screen 33 has a graduated density from side to side so that at one side a considerable amount of light impinging upon and passing through the film 32 may pass to the cell 34 through the focusing lens 35, whereas, toward the other extremity a different quantity of light is permitted to pass and at the final edge none at all. Thus, the lateral displacement of the light beam is converted into intensity variations. With this method it is obvious that it is necessary to confine the amount of the film exposed to the light to a small linear section as to the usual method as to obtain faithful reproduction. However, this method has the particular advantage that the actual density of the positive print of the film is absolutely unimportant because the density of the film can be compensated for by adjusting the strength of the light 30. In developing film it is hard to get the proper density values and if these values are directly converted into sound values, considerable difficulty may be met with and the volume of sound may vary from foot to foot of the film. However, even with varying amounts of development a black portion of the negative will appear as a clear white line in the positive print, and therefore the light falling upon the cell is dependent also upon the lateral displacement of the clear part of the film.

It is to be understood, of course, that with the light sensitive cell of my invention it is possible to use the ordinary saw tooth record and obtain the same results as may be obtained by use of the white line record. With the saw tooth records, there is used either the double cell element with the connection from one end removed or the single cell arranged in the proper direction.

It is also to be clearly understood that a light sensitive cell of my construction is adapted to be utilized with any of the present films in equally as efficient a manner as the present photoelectric reproducing cells. It would therefore be unnecessary to change the type of cell in case an improper film is being run. In the case however, that a variable density record is being run, the spacing of the plates 11 and 12 or 11 and 19 is important and is the determining integration factor.

Having thus described my invention it is to be understood that I am not to be limited by the specific forms shown and described for the purpose of illustration only but that other arrangements may be made within its scope which is to be determined solely by the appended claims.

Having now described my invention, what I claim is:

1. The method of reproduction of sound from a moving film which comprises, converting the varying lateral displacement of a beam of light into two inversely varying electric currents, and differentially actuating a reproducing unit thereby.

2. The method of reproduction of recorded sound from a moving film which comprises, producing a beam of light, varying the lateral displacement of said beam by passing it through a moving sound record, and directly converting the lateral displacement of said beam into two inversely varying electric currents.

3. The method of reproduction of recorded sound from a moving film which comprises, producing a beam of light, varying the lateral displacement of said beam by passing it through a moving sound record, directly converting the lateral displacement of said beam into two inversely varying electric currents, and differentially operating a reproducing unit by said electric currents.

4. The method of reproduction of sound recorded upon a moving film, throughout the entire desired range of volume, which comprises, producing a laterally varying beam of light, the lateral displacement of which will vary in direct proportion to the amplitude of the acoustic displacement to be reproduced, and the frequency of whose lateral displacement will correspond to the tone to be reproduced, optically amplifying the lateral displacement of said beam, converting said lateral displacement into two inversely varying electric currents, the intensity of each of which are varied at the tone frequency by an amount directly and indirectly proportional, respectively, to the desired acoustic displacement, and actuating a differentially operated loud speaking unit by said currents.

5. Apparatus for the reproduction of talking movies which comprises, a photographic sound record adapted to be continuously moved, a light source, and a light sensitive cell; said light source, film, and light sensitive cell being so arranged that an enlarged image of the sound portion of said film is cast upon the light sensitive cell, and said light sensitive cell being composed of means whereby the lateral displacement of the image of said sound portion will cause a current to vary in accordance with said lateral displacement of the limit of said image.

6. Apparatus for the reproduction of talking movies which comprises a photographic sound record adapted to be continuously moved, a light source, and a light sensitive cell, said light source, film, and light sensitive cell being so arranged that an enlarged image of the sound portion of said film is cast upon the light sensitive cell, and said light sensitive cell being composed of means whereby the lateral displacement of the image of said sound portion will cause a current to vary in accordance with the lateral displacement of one limit of said image and second current to vary inversely in accordance with the lateral displacement of the other limit of said image.

7. Apparatus for the reproduction of talking movies which comprises, a photographic sound record adapted to be continuously moved, a light source, a light sensitive cell, said light source, film, and light sensitive cell being so arranged that an enlarged image of the sound portion of said film is cast upon the light sensitive cell, and said light sensitive cell being composed of means whereby the lateral displacement of the image of said sound portion will cause a current to vary in accordance with the lateral displacement of said image and second current to vary inversely also in accordance with the lateral displacement of said image and means for causing said varying electrical currents to operate differentially upon an acoustic member to reproduce the sounds recorded upon said film.

8. The method of reproduction of sound from a moving film which comprises converting the varying lateral displacement of the edges of a beam of light into two inversely varying electric currents.

9. The method of reproduction from a moving film which comprises converting the lateral displacement of the two edges of a beam of light into two inversely varying electric currents and differentially actuating a reproducing unit thereby.

10. The method of reproduction of recorded sound from a moving film which comprises producing a beam of light, varying the lateral displacement of said beam by passing it through a moving sound record, and converting the lateral displacement of the edges of said beam into two inversely varying electric currents.

11. Means for converting the lateral displacement of a beam of light into sound, including a light sensitive cell, means for moving said beam across said cell, a diaphragm, and a pair of coils connected to said cell for operating said diaphragm differentially in accordance with the position of said beam on said cell.

TERRY B. MOREHOUSE.